United States Patent
Pike et al.

(10) Patent No.: US 8,282,256 B1
(45) Date of Patent: Oct. 9, 2012

(54) DECORATIVE LIGHTING SYSTEM

(76) Inventors: John K. Pike, North Hollywood, CA (US); Janet R. Carville, Avon, CT (US)

( * ) Notice: Subject to any disclaimer, the term of this patent is extended or adjusted under 35 U.S.C. 154(b) by 375 days.

(21) Appl. No.: 12/562,726

(22) Filed: Sep. 18, 2009

Related U.S. Application Data (60) Provisional application No. 61/100,356, filed on Sep. 26, 2008.

(51) Int. Cl.
*A41G 1/00* (2006.01)

(52) U.S. Cl. ........ 362/555; 362/554; 362/567; 362/568; 362/581

(58) Field of Classification Search .................. 362/554, 362/564, 567, 568, 581, 123, 231, 293, 555
See application file for complete search history.

(56) References Cited

U.S. PATENT DOCUMENTS

| | | | |
|---|---|---|---|
| 4,264,845 A | 4/1981 | Bednarz | |
| 4,364,102 A | 12/1982 | Huppert et al. | |
| 5,104,608 A | 4/1992 | Pickering | |
| 5,226,709 A | 7/1993 | Labranche | |
| 5,558,422 A | 9/1996 | Sanford | |
| 5,639,157 A | 6/1997 | Yeh | |
| 5,700,081 A | 12/1997 | Mengle et al. | |
| 5,716,124 A | 2/1998 | Hsu | |
| 6,361,198 B1 | 3/2002 | Reed | |
| D474,852 S | 5/2003 | Carville | |
| 6,679,622 B1 | 1/2004 | Kao | |
| 6,979,111 B2 | 12/2005 | Puleo, Sr. et al. | |
| 7,080,931 B2 * | 7/2006 | Kao | 362/567 |
| 2004/0240231 A1 * | 12/2004 | Bina et al. | 362/581 |
| 2005/0052883 A1 * | 3/2005 | Qi et al. | 362/555 |
| 2007/0159842 A1 | 7/2007 | Cole | |
| 2008/0273348 A1 * | 11/2008 | Klohn et al. | 362/567 |

* cited by examiner

*Primary Examiner* — Thomas Sember (57) ABSTRACT

A lighting system for efficiently illuminating various structures using LEDs and fiber-optics. The lighting system generally includes a base unit including at least a first socket and a second socket. A first light source is positioned within the first socket and a second light source is positioned within the second socket, wherein more light sources are used for additional sockets. A first lens may be positioned within the first socket over the first light source to emit a first color and a second lens may be positioned within the second socket over the second light source to emit a second color. At least some of the colors of the lenses are preferably different. At least one light transmitter including a light gathering end and a light dispersing end is positioned within a selected socket to emit a respective color through the light dispersing end.

1 Claim, 6 Drawing Sheets

DECORATIVE LIGHTING SYSTEM

CROSS REFERENCE TO RELATED APPLICATIONS

I hereby claim benefit under Title 35, United States Code, Section 119(e) of U.S. provisional patent application Ser. No. 61/100,356 filed Sep. 26, 2008. The 61/100,356 application is currently pending. The 61/100,356 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to decorative lights and more specifically it relates to a decorative lighting system for efficiently illuminating various structures using LEDs and fiber-optics.

2. Description of the Related Art

Any discussion of the related art throughout the specification should in no way be considered as an admission that such related art is widely known or forms part of common general knowledge in the field.

Decorative lighting systems vary in design and structure. Most decorative lighting systems comprise a string of light bulbs that are wound around or placed upon different types of structures, such as but not limited to Christmas trees and buildings. Conventional lights often become extremely hot when left activated for long periods of time. When strung around a tree, the hot lights can present a fire hazard, which can be avoided only when the lights are switched to an off position.

In addition, most lights of string lights are unreliable. Indoor and outdoor string lights may short circuit or break for unknown reasons. To replace the bulbs, one must spend a great deal of time and often unnecessary expense. Because of the inherent problems with the related art, there is a need for a new and improved decorative lighting system for efficiently illuminating various structures using LEDs and fiber-optics.

BRIEF SUMMARY OF THE INVENTION

A system for efficiently illuminating various structures using LEDs and fiber-optics. The invention generally relates to decorative lights which include a base unit including at least a first socket and a second socket. A first light source is positioned within the first socket and a second light source is positioned within the second socket, wherein more light sources are used for additional sockets. A first lens may be positioned within the first socket over the first light source to emit a first color and a second lens may be positioned within the second socket over the second light source to emit a second color. At least some of the colors of the lenses are preferably different. At least one light transmitter including a light gathering end and a light dispersing end is positioned within a selected socket to emit a respective color through the light dispersing end.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 6 illustrate a decorative lighting system 10, which comprises a base unit 20 including a plurality of sockets 22. A plurality of light sources 30 are positioned within the sockets 22. Lenses 40 are positioned within the sockets 22 over the light sources 30 to emit a respective color. Additional lenses 40 are used for additional sockets 22 and light sources 30. At least some of the colors of the lenses 40 are different. At least one light transmitter 60 including a light gathering end 61 and a light dispersing end 62 is positioned within a selected socket 22 to emit a respective color through the light dispersing end 62. It is appreciated that throughout the specification and claims, color may represent a clear or white light and the colored lens 40 may be integral with the light source 30 or separate than the light source 30.

It is appreciated that preferably at least two sockets 22 and associated light sources 30 and couplers 50 are used to allow for the user to have the choice of at least two illuminated colors for emitting from the light transmitter 60. Generally, two or more light transmitters 60 are also used. It is appreciated however that the lenses 40 may be omitted and the light sources 30 may emit a clear color. It is also appreciated that the light sources 30 may emit different colors or may emit different patterns of illumination, such as a constant illumination or blinking illumination. The light transmitters 60 in turn transmit the different color or patterned illumination to be emitted at the light dispersing end 62.

Figure 1:
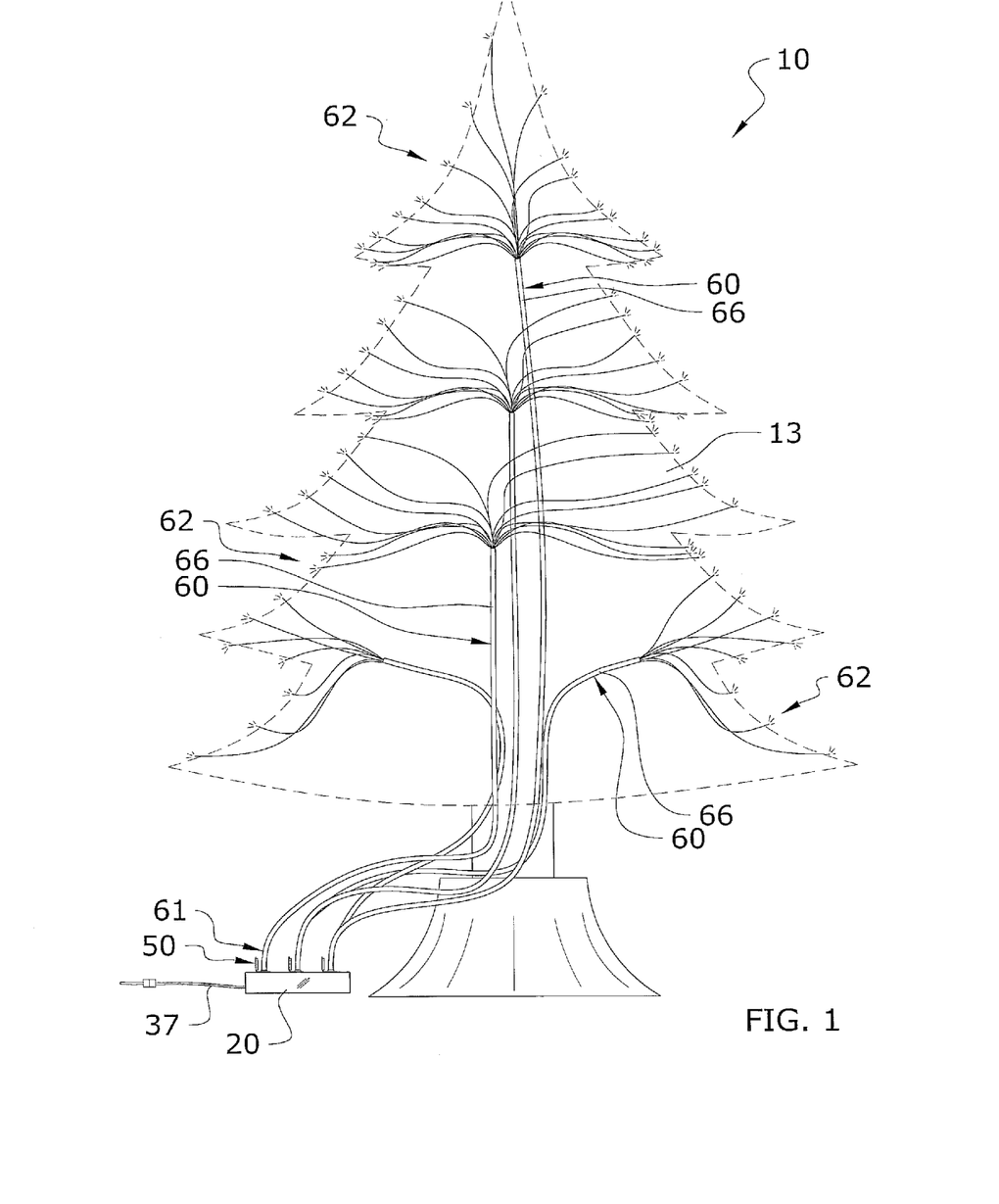
FIG. 1 is an illustration of the present invention being used upon a Christmas tree.
Figure 2:
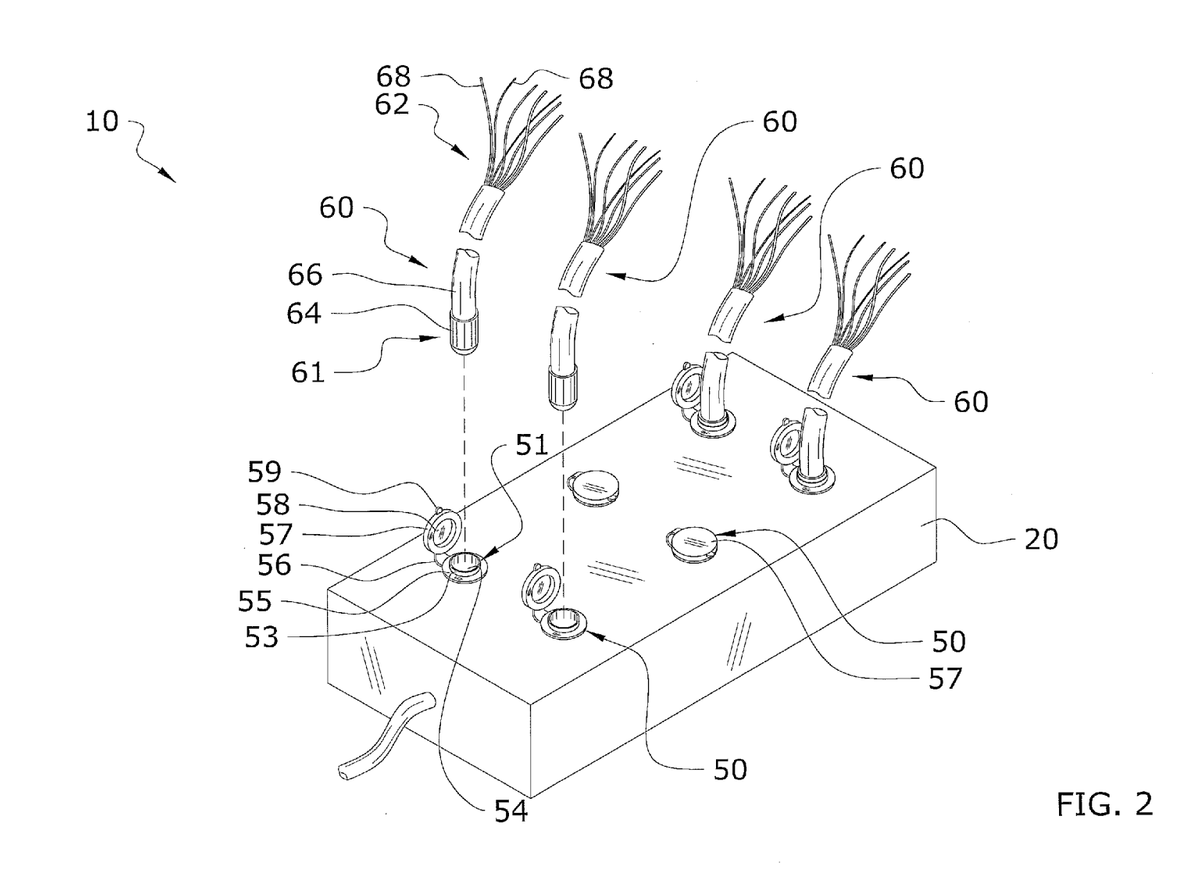
FIG. 2 is an upper perspective view of the present invention with a portion of the sockets being used and a portion not being used.
Figure 3:
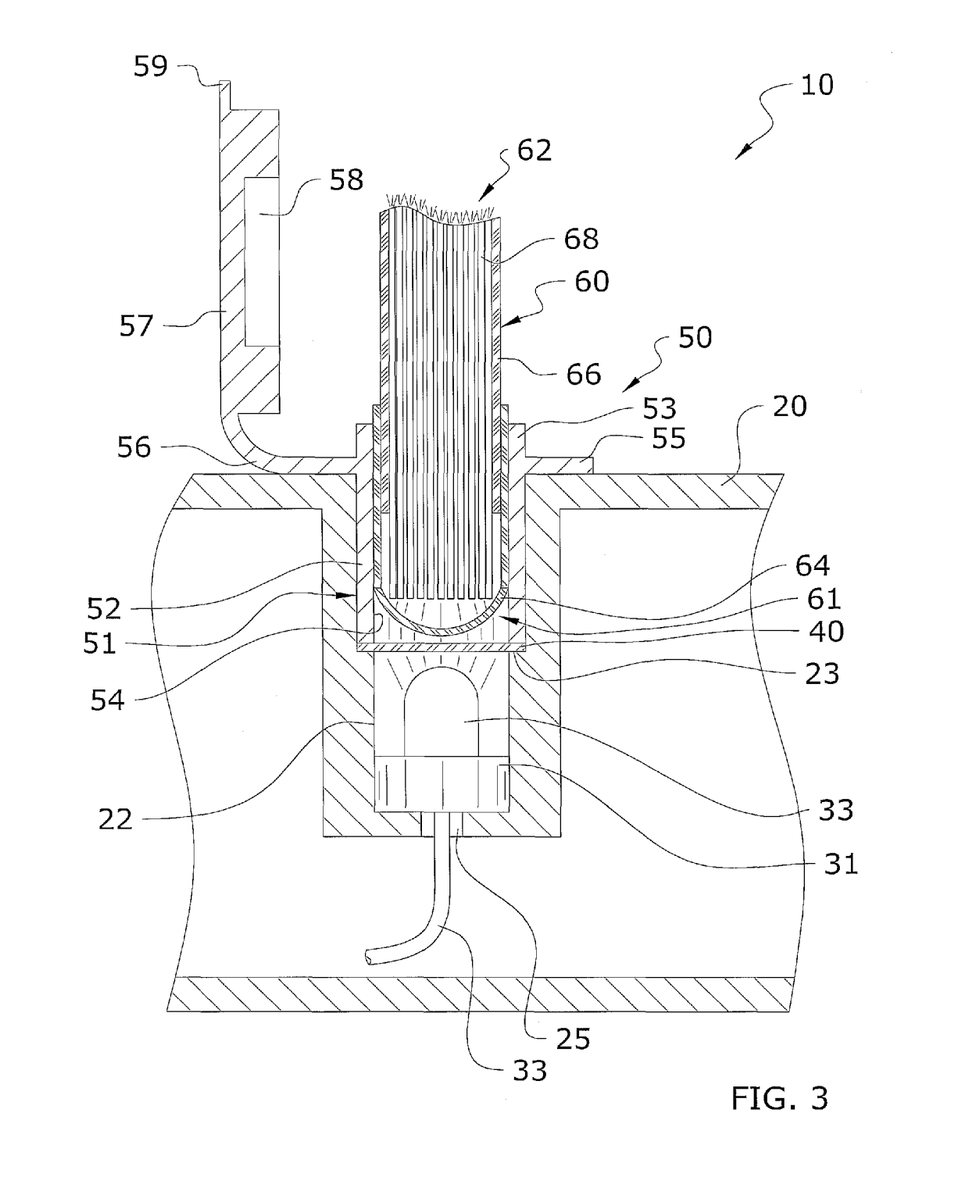
FIG. 3 is a side sectional view of the light transmitter inserted within the socket and the light being illuminated to emit light upon the fiber-optic strands of the light transmitter.
Figure 4:
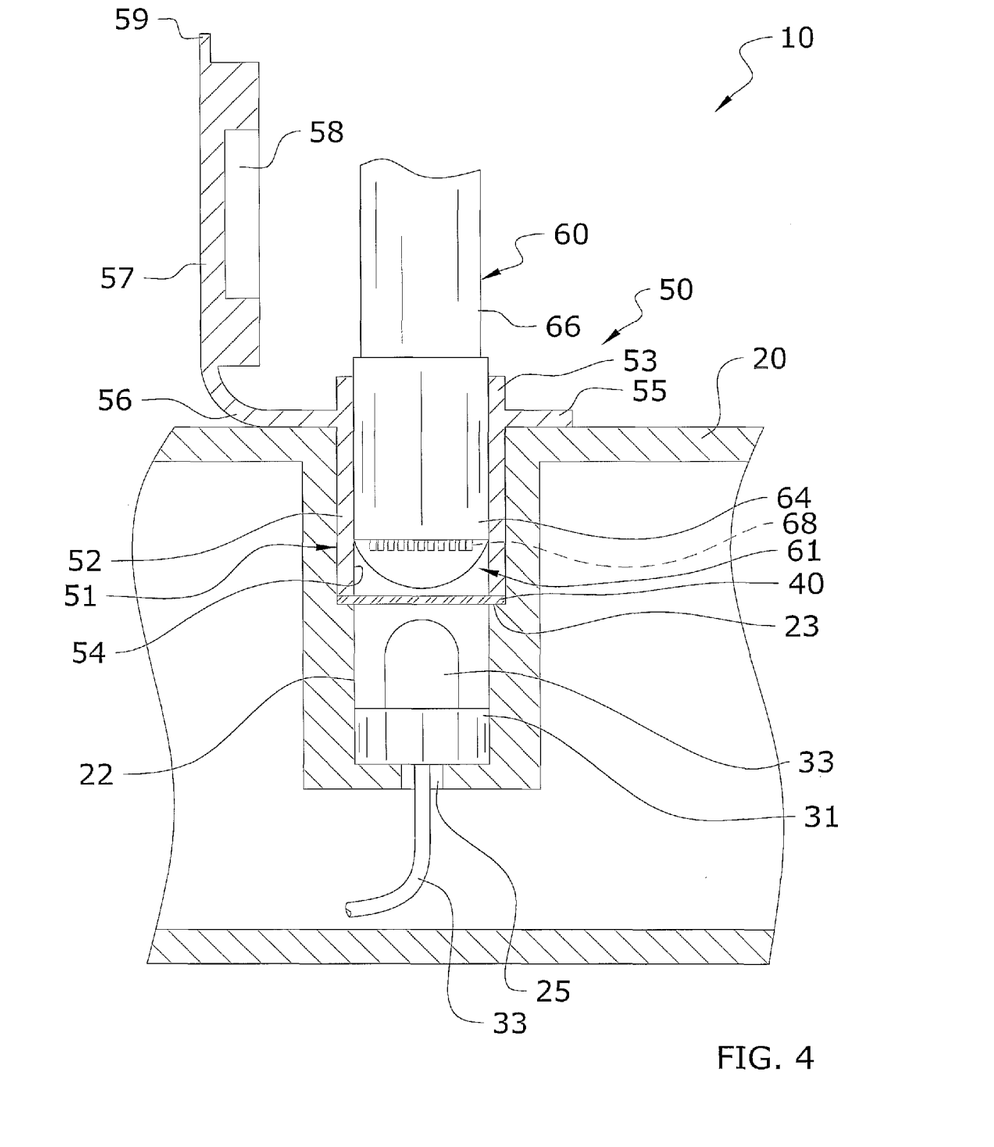
FIG. 4 is a side sectional view of the light transmitter inserted within the socket.
Figure 5:
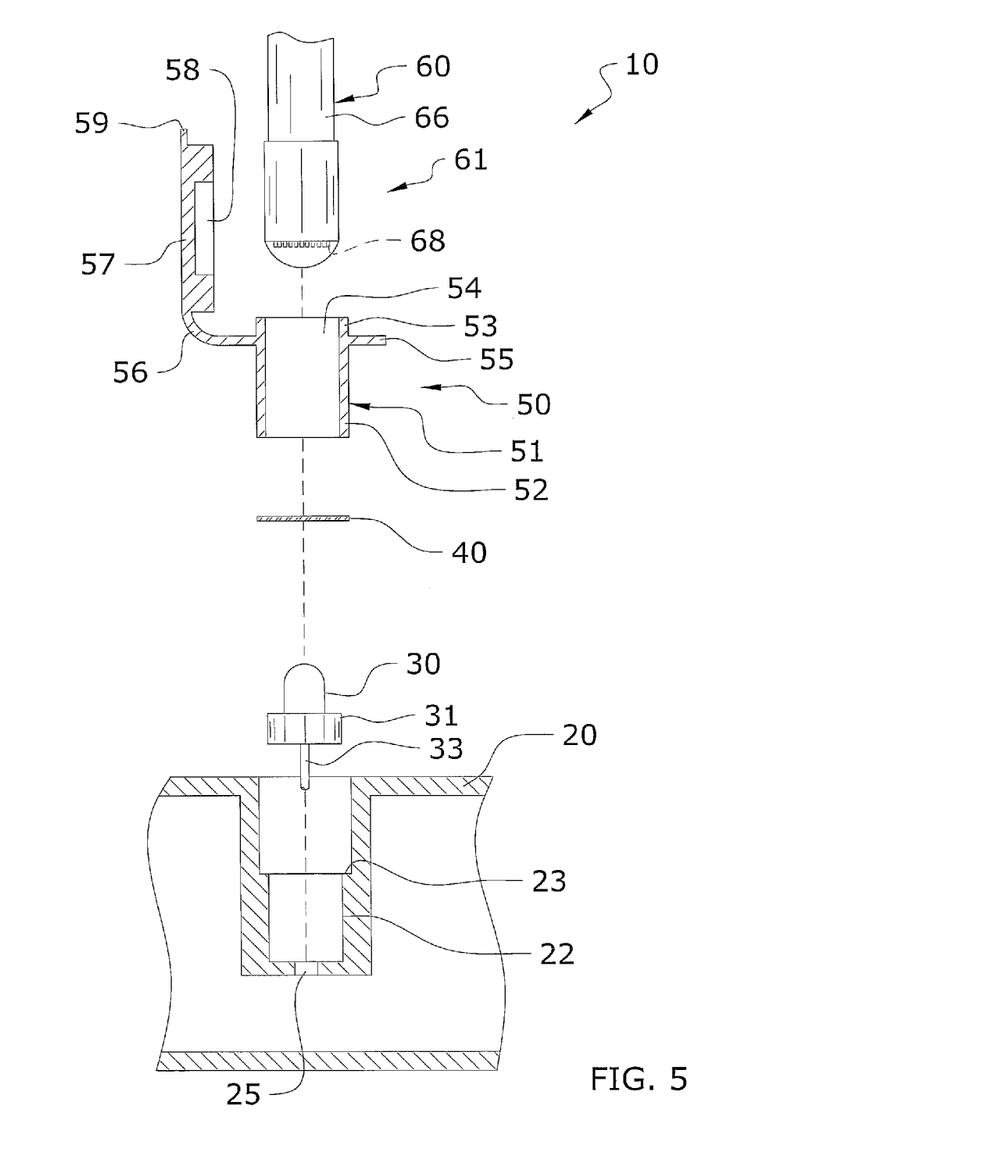
FIG. 5 is an exploded side sectional view of the light transmitter aligned with the socket.
Figure 6:
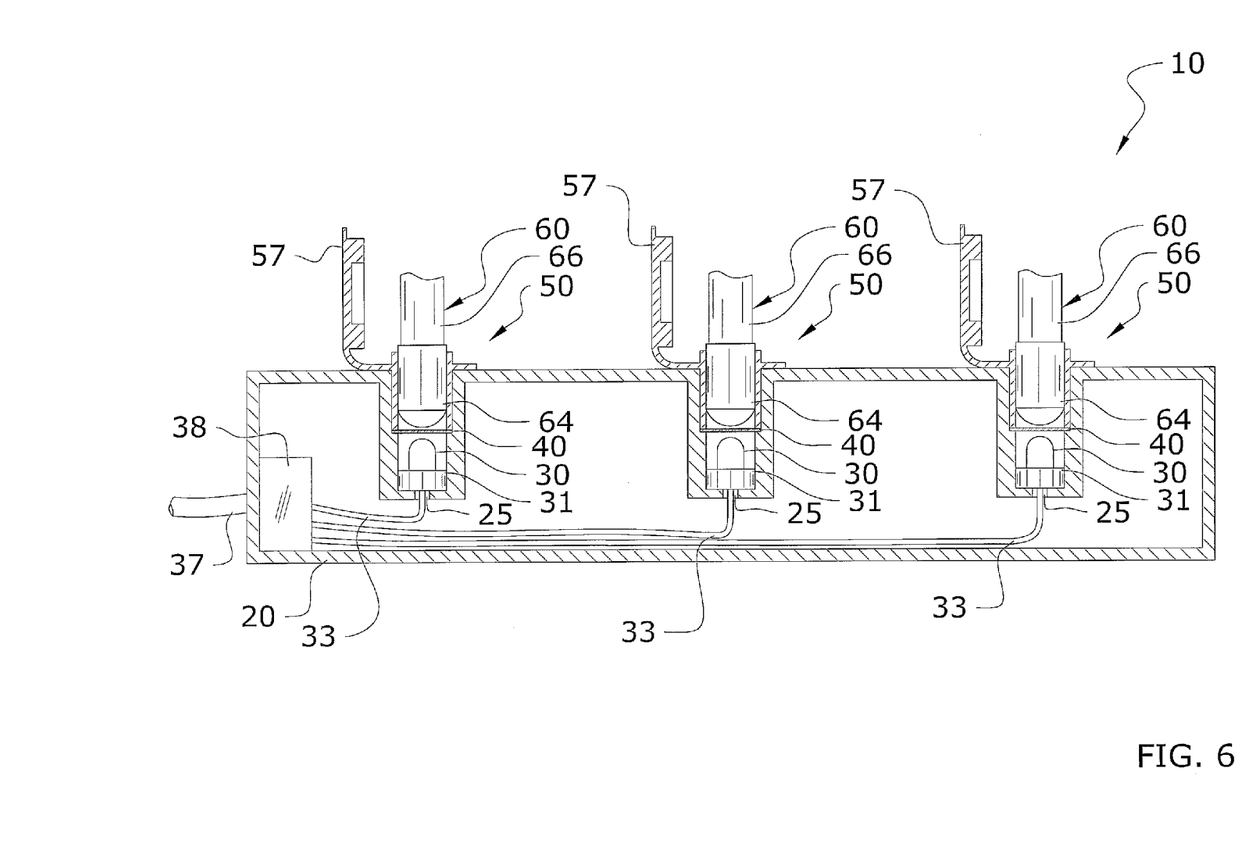
FIG. 6 is a side sectional view of multiple light transmitters inserted within multiple sockets.

The light transmitter(s) 60 is generally placed around a structure 12 for decorative lighting purposes. The light transmitter 60 may also be integral with the structure 12 to extend through the structure 12 or comprise the structure 12 as appreciated. Various type structures 12 may be utilized and decorated via the light transmitters 60. Such structures 12 include, but are not limited to, Christmas trees, Halloween pumpkins, buildings including houses and offices, vehicles, or various other structures or objects. The structures 12 may further be decorated for holiday related themes or for non holiday related purposes.

B. Base Unit

The base unit 20 is used as a distribution center to include the two or more sockets 22 in which the light sources 30, and lens 40 are positioned therein. The base unit 20 may be comprised of various materials, such as but not limited to plastic. The figures illustrate a generic rectangular shaped base unit 20. It is appreciated however that the base unit 20 may be comprised of various configurations or shapes. In one embodiment, the base unit 20 is comprised of a Christmas tree shape or tree stand.

The sockets 22 generally extend through an upper or outer surface of the base unit 20 to within the base unit 20 so that the light source 30 and lens 40 are positioned internal to the base unit 20 when positioned within the socket 22. The base unit 20 preferably includes at least two sockets 22 and may include multiple more sockets 22 each for receiving a light transmitter 60 to distribute an associated color. The sockets 22 may be arranged upon the base unit 20 in multiple configurations. Each of the sockets 22 are generally cylindrical in shape, however the sockets 22 may be shaped in various manners to receive the various light sources 30, lens 40, and gathering end 61 of the light transmitters 60.

C. Light Source

At least one light source 30 is generally positioned within each of the sockets 22 to emit the light that is to be transferred through the light transmitter 60. The light source 30 is preferably comprised of a light emitting diode. As stated previously, the light sources 30 may emit a constant illumination or blinking illumination. The light sources 30 may also emit different colors, rather than using the separate colored lenses 40 or the lenses may be integral with the light sources 30.

Each of the light sources 30 are positioned within the sockets 22 in a manner to be recessed from the outer surface of the base unit 20. The light sources 30 also generally include a support 31 for resting upon the lower end of the socket 22 and a wire 33 extending through an opening 25 in the socket 22 for electrically connecting the light sources 30.

The light sources 30 may be powered through an alternating current source passed through a transformer 38 (generally internal to the base unit 20), such as the use of a power cord 37 extending from the base unit 20 that electrically connects to a wall outlet, or a direct current source, such as batteries within the base unit 20. The light sources 30 are removable from the sockets 22 for replacement when being no longer able to properly illuminate. Each of the light sources 30 are preferably electrically connected in a parallel manner. The light sources 30 may include a master control for simultaneously illuminating all light sources 30 or may include separate controls as appreciated.

D. Colored Lens

A colored lens 40 is preferably positioned over each of the light sources 30 within the sockets 22. It is appreciated that the colored lens 40 may be a separate structure 12 than the light source 30 as illustrated or may be integral with the light source 30, such as directly surrounding the light emitting diode. In the preferred embodiment, the colored lens 40 rests upon a lip 23 formed within the socket 22. The lens 40 is recessed below the outer surface of the base unit 20 to allow adequate room for the light transmitter 60 to extend within the socket 22.

The colored lens 40 may be comprised of various colors, such as but not limited to blue, red, green, purple, orange, yellow, clear, or white. It is appreciated that at least some of the colored lenses 40 positioned within the sockets 22 are comprised of different colors so that a user may pick and choose which color to emit from the light transmitter 60 depending upon which socket 22 the light transmitter 60 is positioned within. The colored lenses 40 may also be omitted from a respective socket 22 if a clear illumination is desired to be emitted from the respective light source 30.

E. Coupler

The coupler 50 is used to interconnect the light transmitter 60 with the sockets 22 in the base unit 20 and also to cover a respective socket 22 when not being used to prevent light from being emitted from the socket 22. The coupler 50 generally includes a tubular portion 51 that extends within the socket 22 on an opposite end as the light source 30 with respect to the colored lens 40. The tubular portion 51 allows light to be directed through a channel 54 extending through the tubular portion 51 to illuminate the light transmitter 60. The tubular portion 51 includes an internal portion 52 positioned internal to the socket 22 and an external portion 53 positioned external to the socket 22. It is appreciated that the tubular portion 51 may be various shapes and diametric sizes to match the size of the light gathering end 61 of the light transmitter 60 and the socket 22.

The coupler 50 also preferably includes a circular flange 55 laterally extending from the tubular portion 51 between the internal portion 52 and the external portion 53 to rest upon the outer surface of the base unit 20 for controlling the depth in which the tubular portion 51 is extended within the socket 22. The flange 55 keeps the external portion 53 of the tubular portion 51 above the outer surface of the base unit 20 for receiving a lid 57 of the coupler 50.

The lid 57 is attached through a hinge 56 which preferably extends from the flange 55. The lid 57 selectively extends over the channel 54 of the tubular portion 51 for covering the channel 54 and preventing light from being emitted from the socket 22. The lid 57 preferably includes a recess 58 extending therein for being received by the external portion 53 of the tubular portion 51 to frictionally connect the lid 57 to the external portion 53. The lid 57 may also include a tab 59 extending from a perimeter of the lid 57 for easily grasping the lid 57 to open and close the lid 57 about the tubular portion 51.

F. Light Transmitter

At least one non-heat producing light transmitter 60 is used to transfer the light emitted from the light source 30 through the colored lens 40. The light transmitter 60 is preferably comprised of string configuration and further preferably comprised of a fiber-optic cable. In the preferred embodiment, a plurality of light transmitters 60 may be used, wherein each light transmitter 60 is inserted within a separate socket 22 to emit a respective color as appreciated. The light transmitters 60 are thus each connected to the light sources 30 in an electrically parallel manner with respect to each other. As appreciated the light transmitters 60 emit a correlating emitted color or pattern of illumination (e.g. constant, blinking) as associated with a respective light source 30 and possibly colored lens 40.

The light transmitter 60 includes the light gathering end 61 and the light dispersing end 62. The light gathering end 61 includes a reflective casing 64 which the fiber-optic strands 68 are visible through to be inserted within the channel 54 of the tubular portion 51 of the coupler 50 to receive the light emitted from the light source 30 through the colored lens 40. The reflective casing 64 is generally comprised of a clear or transparent color for allowing the light to pass through and illuminate the strands 68.

The reflective casing 64 of the light gathering end 61 is frictionally connected within the channel 54 of the tubular portion 51 to allow easy insertion and removal via sliding the reflective casing 64 in and out of the channel 54. The light transmitter 60 includes an elongated tubular jacket 66 for securing the strands 68 in a bundle form along a portion of the longitudinal length of the light transmitter 60 to be collectively received within the tubular portion 51 of the coupler 50 and socket 22. The jacket 66 may be comprised of various colors.

Near the light dispersing end 62 of the light transmitter 60, the jacket 66 is omitted to allow the strands 68 to be dispersed loosely throughout the structure 12, such as intertwining the strands 68 around the branches of the Christmas tree. The light dispersing end 62 emits the light collected at the light gathering end 61 of the light transmitter 60. The light transmitter 60 may be freely placed around the structure 12 as appreciated.

G. Operation of Preferred Embodiment

In use, power is supplied to the light sources 30 to illuminate the light sources 30. It is appreciated that each of the sockets 22 preferably include a light source 30, a desired colored lens 40 positioned over the light source 30 and a coupler 50 attached to an outer end of the socket 22. The lid 57 of each of the couplers 50 is moved to a closed position if that associated socket 22 is not being used to prevent the light from being emitted from the socket 22. If a desired socket 22 is used, such as because the associated light color is desired to be used, the lid 57 is pivotally moved to an open position and the reflective casing 64 of the light gathering end 61 is positioned within the channel 54 of the tubular portion 51.

The light is emitted through the light dispersing end 62 of the light transmitter 60 via the light source 30 illuminating the fiber-optic strands 68 of the light transmitter 60 through the respective colored lens 40 and reflective casing 64. The emitted colored light is able to travel along the strands 68 to the light dispersing end 62. The light transmitters 60 may be placed upon various structures 12, such as a Christmas tree. It is also appreciated that multiple light transmitters 60 may connected together in a series manner for producing a longer light transmitter 60.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A decorative lighting system, comprising:
a base unit including at least a first socket and a second socket, wherein said first socket and said second socket are internal to said base unit;
at least a first LED and a second LED;
wherein said first LED is positioned within said first socket;
wherein said second LED is positioned within said second socket;
at least a first lens and a second lens;
wherein said first lens is positioned within said first socket over said first LED to emit a first color via said first LED;
wherein said second lens is positioned within said second socket over said second LED to emit a second color via said second LED;
at least a first coupler and a second coupler;
wherein said first coupler includes a first tubular portion including a first external portion and a first internal portion;
wherein said first internal portion is positioned within said first socket opposite said first light source with respect to said first lens and wherein said first external portion is positioned outside of said first socket;
wherein said first coupler includes a first flange laterally extending from said first tubular portion between said first external portion and said first internal portion;
wherein said first coupler includes a first hinge extending from said first flange;
wherein said first coupler includes a first lid extending from said first hinge, wherein said first lid is pivotally connected to said first tubular portion;
wherein said first lid includes a first recess for receiving said first external portion of said first tubular portion in a closed position of said first coupler;
wherein said first lid prevents an emitted light from escaping said first socket in said closed position;
wherein said first lid allows an emitted light from escaping said first socket in an open position;
wherein said first lid includes a first tab extending outwardly therefrom;
wherein said second coupler includes a second tubular portion including a second external portion and a second internal portion;
wherein said second internal portion is positioned within said second socket opposite said second light source with respect to said second lens and wherein said second external portion is positioned outside of said second socket;
wherein said second coupler includes a second flange laterally extending from said second tubular portion between said second external portion and said second internal portion;
wherein said second coupler includes a second hinge extending from said second flange;

wherein said second coupler includes a second lid extending from said second hinge, wherein said second lid is pivotally connected to said second tubular portion;

wherein said second lid includes a second recess for receiving said second external portion of said second tubular portion in a closed position of said second coupler;

wherein said second lid prevents an emitted light from escaping said second socket in said closed position;

wherein said second lid allows an emitted light from escaping said second socket in an open position;

wherein said second lid includes a second tab extending outwardly therefrom; and at least a first fiber-optic cable and a second fiber-optic cable;

wherein said first fiber-optic cable includes a first light gathering end and a first light dispersing end, wherein said first light gathering end is positioned within said first tubular portion to emit said first color through said first light dispersing end;

wherein said first fiber-optic cable includes a first plurality of strands;

wherein said first fiber-optic cable includes a first jacket at said first light gathering end for collective insertion within said first socket and wherein said first plurality of strands are loosely dispersed at said first light dispersing end;

wherein said second fiber-optic cable includes a second light gathering end and a second light dispersing end, wherein said second light gathering end is positioned within said second tubular portion to emit said second color through said second light dispersing end;

wherein said second fiber-optic cable includes a second plurality of strands;

wherein said second fiber-optic cable includes a second jacket at said second light gathering end for collective insertion within said second socket and wherein said second plurality of strands are loosely dispersed at said second light dispersing end.

* * * * *